United States Patent [19]

Krupa

[11] Patent Number: 5,770,240
[45] Date of Patent: Jun. 23, 1998

[54] EXTRUSION DIE FOR RIGID FOAM SHEET

[75] Inventor: Vernon Krupa, Chippewa, Wis.

[73] Assignee: Extrusion Dies, Inc., Chippewa Falls, Wis.

[21] Appl. No.: 631,549

[22] Filed: Apr. 12, 1996

[51] Int. Cl.$^6$ .................................................. B29C 47/22
[52] U.S. Cl. ..................... 425/192 R; 425/380; 425/381; 425/466; 425/817 C
[58] Field of Search ................................ 425/378.1, 380, 425/381, 466, 817 C, 192 R, 462, 463, 382.4; 264/45.9

[56] References Cited

U.S. PATENT DOCUMENTS

| | | | |
|---|---|---|---|
| 3,680,997 | 8/1972 | Dukert et al. ............................ | 425/381 |
| 3,870,451 | 3/1975 | Gokcen ................................. | 425/378 R |
| 4,302,172 | 11/1981 | Hogseth et al. ......................... | 425/466 |
| 4,708,618 | 11/1987 | Reifenhauser et al. .............. | 425/192 R |
| 4,797,083 | 1/1989 | Reifenhauser ....................... | 925/378.1 |
| 5,045,259 | 9/1991 | Peelman et al. ........................ | 425/4 C |
| 5,132,062 | 7/1992 | Brambilla ............................. | 425/817 C |
| 5,259,747 | 11/1993 | Cloeren .................................. | 425/466 |
| 5,284,430 | 2/1994 | Tomic et al. ............................ | 425/466 |

Primary Examiner—Jay H. Woo
Assistant Examiner—Iurie A. Schwartz
Attorney, Agent, or Firm—Marshall, O'Toole, Gerstein, Murray & Borun

[57] ABSTRACT

An extrusion die for foam sheet including a die body defining a manifold for conducting a split stream of heated and pressurized foamable thermoplastic melt through separate distribution channels to a die terminus. A pair of mating die lips are arranged on opposed sides of the melt and are constructed to adjustably slide toward and away from each other to vary the flow of a melt. The lips are each mounted to slide along an axis which is tilted rearwardly at an acute angle relative to an orthogonal to the sheet being formed. The mandrel is configured and adapted for quick withdrawal and replacement from an end of the die through a passageway extending through the die transverse to the direction of extrusion of a sheet.

23 Claims, 4 Drawing Sheets

EXTRUSION DIE FOR RIGID FOAM SHEET

TECHNICAL FIELD

The present invention relates generally to extrusion apparatus, and more particularly to an extrusion die for rigid foam sheet products.

BACKGROUND ART

In recent years the marketplace has exhibited an increasing demand for rigid expanded thermoplastic products in the higher density ranges, particularly in geographical areas experiencing a shortage of raw wood. Such products include decorative moldings and the like, but more particularly larger panels for use as cabinet doors, room doors, furniture, packaging, construction board, and the like.

It is important in such applications for rigid foam sheet products that the product have a smooth and hard outer skin, that the sheet have favorable mechanical properties, and low manufacturing cost. The cell size and the cross-sectional uniformity of the cells from the inside to the surface of the sheet will determine the density of the material as well as its load bearing characteristics and its weight, all of which are important properties for its intended use as a wood substitute. As used herein, the term "rigid foam sheet" is intended to refer to any foam sheet which has a hard or firm external skin, whether or not the sheet has a hardened center sheet-like core as is typical of many extruded foam sheet products manufactured by inward-foaming extrusion processes.

The present invention concerns an extrusion die for use in the continuous manufacture of thermoplastic rigid foam sheet products by a process known as "foaming inwards" or "inward-foaming" foam extrusion. The method of "foaming outwards" is an older, simpler method in which a thermoplastic polymer with a foaming agent is extruded through a wide slit. The hot, soft, still-foaming extrusion material is led directly to an in-line calibrating facility where the process of expansion of the foam is stopped by contact of the foaming extrudate with a cooled surface.

The inward-foaming process, sometimes termed the "Celuka" process, is described in a 1973 U.S. Pat. No. 3,764,642 to Boutillier. It has the advantage over other extrusion processes used to form rigid foam sheet of not requiring any calendaring or other post processing to form a hard skin on the sheet.

In the '642 process, a mandrel or "torpedo" is employed in the extrusion die to split the path of the melt and create a hollow space inside the melt into which the melt can foam (hence the term "inward-foaming"). The outer surfaces of the melt are cooled by a closely following cooled calibrator, forming a skin in which no foaming takes place. The melt foams into the hollow form towards the center of the melt until the hollow is filled and an equilibrium counter pressure is created inside the melt.

The Celuka inward-foaming process described in the '642 patent is discussed in U.S. Pat. No. 4,399,086 to Walter. The '086 Walter patent states that by use of the inward-foaming process, the density of the foamed material can be varied by appropriate choice of parameters such as torpedo shape and size, cooling rate and withdrawal rate of the melt, composition of the melt, etc. The resulting outer skin is relatively thick, however, and the foamed core layer contains cells widely varying in size, and cell diameter. The structure is said by Walter to often be non-homogeneous, in particular in the cross section at the center line where the two inwardly foaming layers meet. "Not infrequently a laminar, linear texture, or even internal separation of the material can be observed at the center line. The resultant weakening of the core can be of disadvantage in applications where the sheet is subject to high mechanical stressing and rigidity is especially important."

Importantly, the '086 patent criticizes the inward-foaming process for its inability to produce thin sheets more than 1000 mm wide and less than 10 mm thick, except at great expense. Two reasons are given: 1) it is not possible to create the space in the die with a torpedo which has a very small height to width ratio, and 2) the outer skin cannot be produced thinner than a certain value due to the intensive cooling needed to create the hollow section during calibration.

The Walter '086 process purports to overcome the problems of the inward-foaming process by a process in which the polymer melt is permitted to foam unrestrained, and is then post-processed by sequential application of cooling and heat to create the desired properties of the resulting foam product.

The January 1994 issue of *Modern Plastics*, pages 21–22, describes an extrusion die of the inward-foaming type manufactured by Cincinnati Milacron. The Milacron system utilizes an adapter after the extruder which horizontally splits the melt stream. The resulting dual melt streams are guided to a ringed lip and mandrel system which is said to eliminate the need for a strut or spider to support the mandrel.

The melt passes over the die lips which are oil-cooled to 140 degrees. The material then enters a 20 mm precalibrator where the outer edge is cooled so quickly that the melt (PVC) does not have a chance to bubble.

The lips are of the flexible hinge adjustable type. The Milacron die is believed to be capable of producing rigid foam sheet no thinner than 10 mm.

Despite the enumerated favorable attributes of prior art rigid foam extrusion dies of the inward-foaming type, shortcomings exist. No known prior rigid foam extrusion die is capable of producing acceptable rigid foam sheet in thickness less than 10 mm.

The Milacron die can handle a very limited range of extrusion slit gauge adjustments due to the use of flexible-hinge-type adjustment lips. To make a significant change in sheet gauge with the Milacron die requires effectively disassembling a major part of the die and replacing major components, including the adjustable lips, with consequent down time and component cost burden. Flow and pressure control is inadequate to produce acceptable rigid foam sheet product across in a wide range of foam sheet gauges.

U.S. Pat. No. 4,797,083 to Reifenhauser depicts an extrusion die of the inward-foaming type which utilizes an elongated melt-splitting mandrel supported without ribs. The elimination of such ribs is said to avoid undesirable texturing of the sheet caused by such ribs and non-uniform foaming in the edge regions of the extruded product. Flow control is provided by adjustable flow control members positioned in throttling passages in each of the melt streams.

SUMMARY OF THE INVENTION

In accordance with the present invention, an extrusion die for rigid foam sheet includes a die body defining a manifold comprising separate distribution channels for conducting a split stream of heated and pressurized foamable thermoplastic melt to a die terminus where the melt is caused to merge and foam. A pair of mating die lips are located at the die terminus and are arranged on opposed sides of the melt. The lips are constructed to adjustably slide toward and away from each other to vary the flow of the melt. In one aspect of the invention, the separate distribution channels defined by the die body means are configured to merge within the die to create a chamber between the lips in which the melt foams. In another, the separate distribution channels defined by the die body means are configured to cause the melt to merge and foam outside the die.

Preferably, the lips are each mounted to slide along an axis which is tilted rearwardly at an acute angle relative to an orthogonal to the sheet being formed. According to another aspect of the present invention, the nearest surfaces of the separate distribution channels are defined at least in part by an intervening mandrel. The mandrel is preferably configured and adapted for quick withdrawal and replacement from an end of the die through a passageway extending through the die transverse to the direction of extrusion of the sheet. To change the thickness of a sheet product to be extruded, the operator need merely quick-change the mandrel and adjust the separation of the lips.

The die passageway in cross-section desirably has a portion which is convergent toward the rear of the die and the mandrel has a mating cross-sectional configuration. The mandrel is adapted to be quickly and securely locked into the convergent portion of the passageway by a screw or other attachment means applied from the rear of the die.

Desirably, the extrusion die of the preferred form of the invention includes a pair of cooled precalibration blocks for assisting in forming a skin on the outer surfaces of the melt, the precalibration blocks being affixed to the lips to move therewith. Preferably, an air gap is formed at an interface between each of the precalibration blocks and the lip to which it is affixed to enhance the thermal isolation of the precalibration block from the lip.

In a preferred implementation of the principles of the invention, a pair of adjustable restrictor bars are located in the die upstream of the lips for regulating the pressure and melt flow in the separate channels in the region of the lips.

The extrusion die of the present invention is capable of producing quality rigid foam sheet product in a wide range of thickness from at least 30 mm to 3 mm or less, thus overcoming the serious small gauge sheet capabilities of prior inward-foaming extrusion dies. Through the convenience offered by the quick-change, side-exit mandrel and the dual slide-action adjustable lips, set-up time and cost to change the gauge of foam sheet to be produced is substantially reduced.

Further, other limitations of prior inward-foaming extrusion processes identified in the Walter '068 patent—too-thick skins, center separation, and poor mechanical properties—are also overcome by the die of the present invention.

DESCRIPTION OF THE PREFERRED EMBODIMENTS

Figure 1:
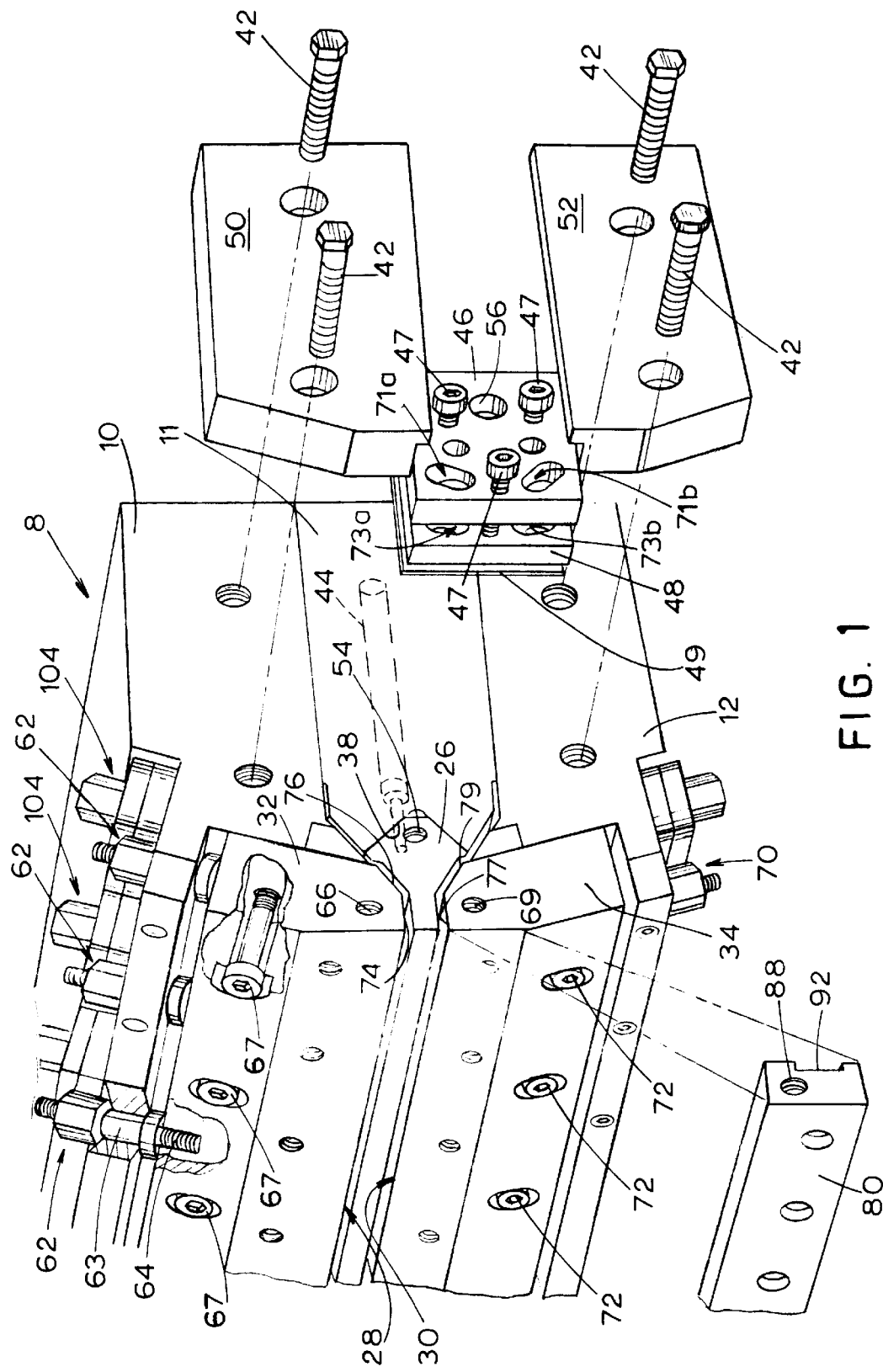
FIG. 1 comprises a fragmentary perspective view of a rigid foam sheet extrusion die constructed in accordance with the present invention.
Figure 2:
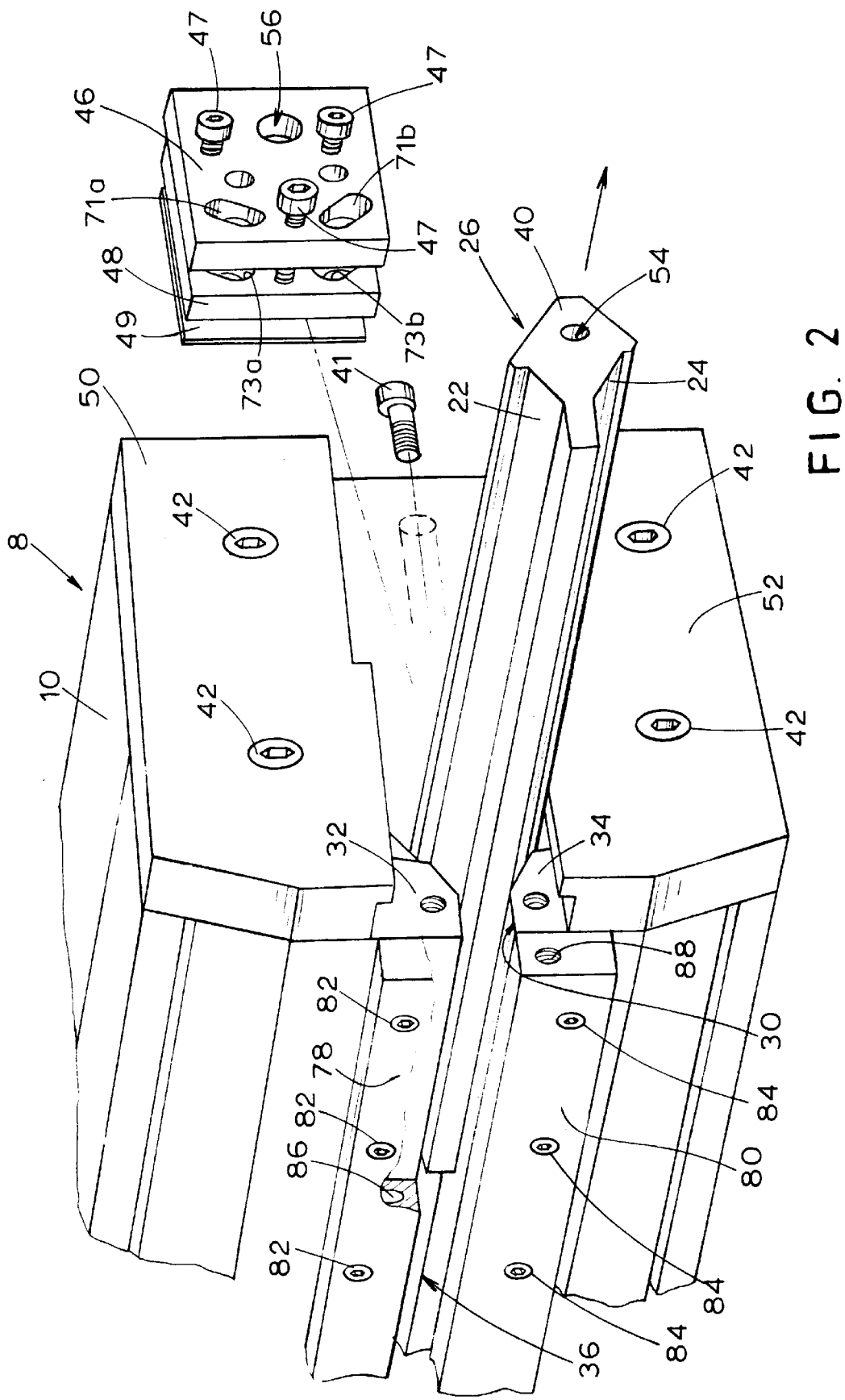
FIG. 2 comprises a view corresponding to FIG. 1 which depicts a mandrel constituting part of the FIG. 1 die being removed from an end of the die.
Figure 3:
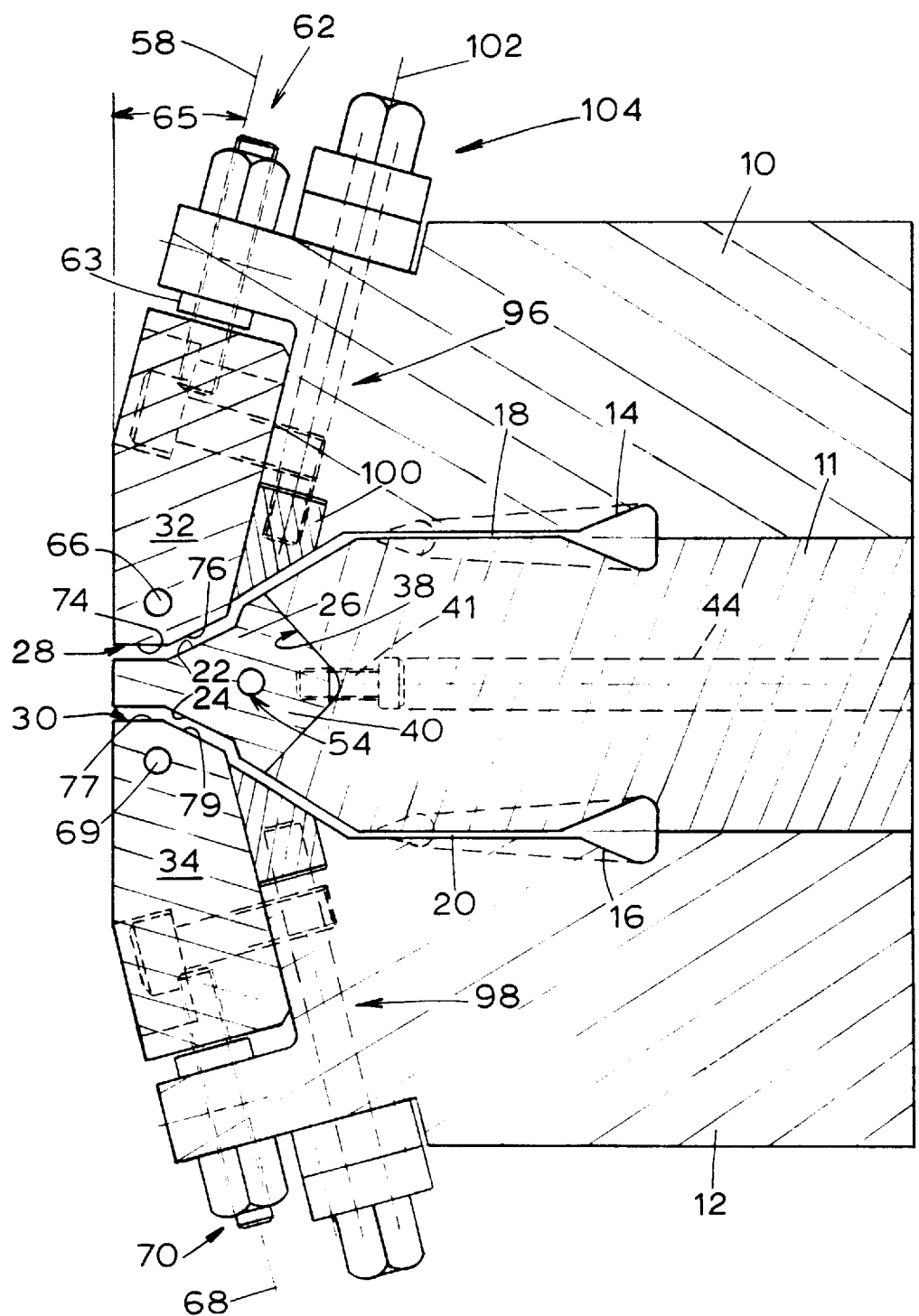
FIG. 3 comprises a section view taken along lines 3—3 in FIG. 1.

FIGS. 1–3 illustrate an extrusion die 8 for making rigid foam sheet in accordance with the teachings of the present invention, comprising an upper die body 10, a center die body 11 and a lower die body 12. The upper die body 10 and center die body 11 define an upper manifold 14. The center die body 11 and lower die body 12 define a lower manifold 16. The upper and lower manifolds 14, 16 conduct a split stream of heated thermoplastic melt from an extruder (not shown) through separated upper distribution channel 18 and lower distribution channel 20 to a die terminus.

At the die terminus, the nearest surfaces 22, 24 of the upper and lower distribution channels 18, 20, respectively, are defined by an intervening mandrel 26. The remote surfaces of the upper and lower distribution channels 18, 20 in the terminal region of the die are constituted by the faces 28, 30 of upper lip 32 and lower lip 34, respectively. (See FIG. 3.)

Referring particularly to FIG. 2, in accordance with an aspect of the present invention, the mandrel 26 is configured and adapted for quick withdrawal and replacement from an end of the die through a passageway 36 extending through the die 8 transverse to the direction of extrusion of the foam sheet. (The foam sheet is not shown.)

Specifically, the passageway 36 formed in the center die body 11 in cross section has a portion 38 (see FIG. 3) which is convergent toward the rear of the die body. The mandrel 26 has a configuration in cross-section with a male convergent portion 40 which mates with the female convergent portion 38 of the die body 11, forming a keyway configuration which assures secure and geometrically accurate positioning of the mandrel 26 in the die body when properly located in the passageway 36.

In order that the mandrel may be quickly and securely locked into the convergent portion 38 of the passageway 36, attachment means such as a series of bolts, one of which is shown at 41, engage the convergent portion 40 of the mandrel 26 through a rear opening 44 in the die body 11. (See FIG. 3.)

A pair of end seal plates 46, 48 are held in place against a gasket 49 by end seal retainer plates 50, 52 which are in turn secured by bolts 42. The end seal plates 46, 48 are separated by adjustment screws 47 which are turned to adjust the pressure of end seal plate 48 and gasket 49 against the die body. The mandrel 26 can be quickly removed and replaced with a mandrel adapted for a different gauge sheet or different properties, or removed for maintenance and/or repair, by simply removing the end seal plates 46, 48 and sliding the mandrel 26 out of the passageway 36 in the center die body 11.

The mandrel 26 has a conduit 54 throughout its length for conducting a coolant. A coolant supply is coupled to the mandrel 26 by means of a fitting (not shown) connected to the conduit 54 through openings in the end seal plates 48, 50. The opening in end seal plate 46 is shown at 56.

In accordance with an aspect of the present invention, the upper and lower lips 32, 34 are constructed and arranged to adjustably slide toward and away from each other to vary the melt flow in the upper and lower distribution channels 18, 20. The upper lip 32 is mounted to slide along an adjustment axis 58 (FIG. 3) by rotational adjustment of a series of like lip adjusting spools 62. The spools 62 each comprise a unitary collar-sleeve-nut member 63 which turns on a threaded shaft 64 screwed into a threaded bore in the upper lip 32.

A series of like lock bolts 67 secure the upper lip 32 firmly against the upper die body 10 when the upper lip 32 has been set to the desired position by adjustment of spools 62. The lock bolts 67 can be set to immobilize the lip, or can be set just firmly enough to permit adjustment of the lip without fluid leakage.

The lower lip 34 is similarly adjustable along an adjustment axis 68 and, like the upper lip 32 described immediately above, is adjustable in position and longitudinal configuration by means of a series of lip adjustment spools, one of which is shown at 70. The lower lip 34 is secured in place by a series of like lock bolts 72.

The upper and lower lips 32, 34 are cooled by introduction of a coolant from a supply (not shown) into conduits 66, 69 in the lips 32, 34 through fittings (not shown) passing through openings 71a, 71b, 73a, 73b in end seal plates 46, 48. The openings 71a, 71b, 73a, 73b are angled at the tilt angle 65 of the upper and lower lips 32, 34 to permit the lips to be adjusted without interfering with the coolant fittings.

It is known to use an adjustable lip having a construction somewhat similar to that described above in the manufacture of large gauge non-foamed thermoplastic sheet products, however, in accordance with a novel aspect of the present invention, the adjustment axes 58, 68 of the adjustable lips 32, 34 are tilted rearwardly at an acute angle relative to an orthogonal to the sheet being formed. In the illustrated preferred extrusion die embodiment, the adjustment axes 58, 68 of the upper and lower lips 32, 34 are both tilted rearwardly by the same tilt angle 65. The tilt angle 65 is preferably between about 10 degrees and 20 degrees to a line orthogonal to the foam sheet being extruded. In a die successfully tested, the tilt angle 65 is 15 degrees.

In accordance with another aspect of the invention, referring particularly to FIG. 3, the face 28 of the upper lip 32 has a forward face portion 74 which is parallel to the sheet being formed, and a rear face portion 76 which forms an acute angle with the plane of the sheet. The lower lip 34 has a similar forward face portion 77 and rear face portion 79. This truncation of the rear corners of the adjustable lips 32,34 improves the streamlining of the upper and lower distribution channels 18, 20, particularly when the die is set up to produce small gauge foam sheets.

Upper and lower precalibration blocks 78, 80 are affixed to the upper lip 32 and lower lip 34, respectively, by means of a series of like bolts, shown at 82 for the block 78, and at 84 for the block 80. The precalibration blocks 78, 80 have conduits 86, 88, respectively, formed therein for conducting coolant through the blocks 78, 80.

It is often desirable that, in order to enhance the formation of a hard skin on the foam product being formed, the temperature of the precalibration blocks 78, 80 is maintained at a significantly lower temperature than the temperature of the adjustable lips 32, 34.

In order to improve the thermal isolation between the blocks 78, 80 and the lips 32, 34, recesses are provided in the blocks 78, 80, respectively, to create air gaps between the blocks 78, 80 and lips 32, 34. The recess in the lower block 80 is shown at 92.

In accordance with another aspect of the present invention, the extrusion die 8 includes a pair of adjustable upper and lower restrictor bar assemblies 96, 98 which are adjusted vertically and laterally in concert with vertical and lateral adjustments of the lips 32, 34 in order to control and properly profile the flow of thermoplastic melt in the terminal region of the die 8.

The restrictor bar assemblies 96, 98 may have a structure which is similar to that found in restrictor bar assemblies for extrusion dies for non-foamed extruded thermoplastic sheet products. The upper restrictor bar assembly 96 comprises an upper restrictor bar 100 which is adjustable along a restrictor bar adjustment axis 102 by means of a series of like adjustment spools 104. The adjustment spools 104 may be constructed similar to the lip adjustment spools 62, 70 described above for adjusting the lips 32, 34.

The upper restrictor bar 100 is located upstream of the upper lip 32 and regulates the melt flow in the upper distribution channel 18 in the region adjacent the upper lip 32. It is preferred that the adjustment axis 102 of the upper restrictor bar 100 be tilted rearwardly by the same angle as the tilt angle 65 of the adjustment axis 58 of the upper lip 32 such that the upper lip 32 and the upper restrictor bar 100 move in parallel.

The lower restrictor bar assembly 96 is preferably constructed similar to the upper restrictor bar assembly 98.

Figure 4:
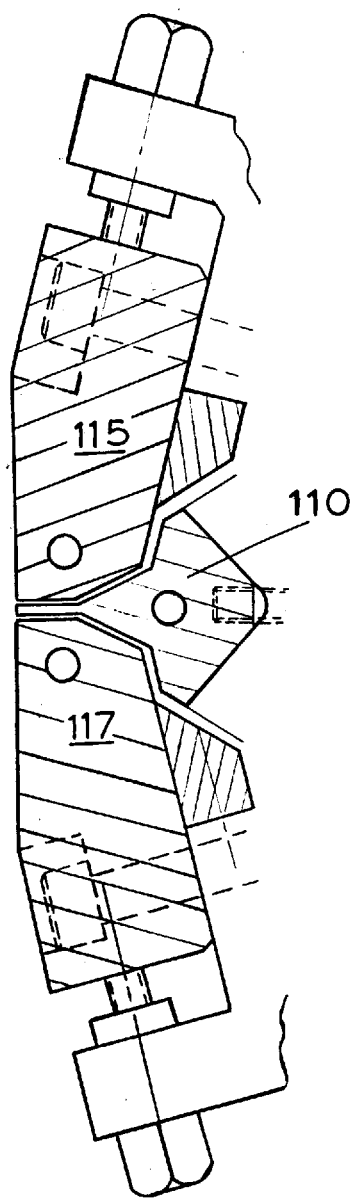
FIG. 4 comprises a section view corresponding to FIG. 3, in which the FIG. 3 mandrel has been replaced by a mandrel adapted for the extrusion of thinner gauge foam sheet;.

FIG. 4 illustrates another embodiment of the illustration wherein a mandrel 110 adapted for the manufacture of very thin rigid foam sheet is substituted for the mandrel 26 of the FIGS. 1–3 embodiment, as described above. Upon quick-exchange of the mandrel 110 for an existing mandrel, the lips 115, 117 are simply readjusted to establish proper process conditions for the new run.

As noted, employing the teachings of the present invention, to change the thickness of a sheet product to be extruded, the operator need merely quick change the mandrel and adjust the separation of the lips 32, 34. In contrast, using the extrusion die of Cincinnati Milacron discussed above in the BACKGROUND ART section of this specification, to make a significant change in the thickness of a foam sheet product to be produced, a major disassembly of the die is required. A complete replacement of the adjustable lip assemblies may be required, due to the limited range of motion of the flexible hinge type adjustable lip utilized in the Milacron extrusion die.

Figure 5:
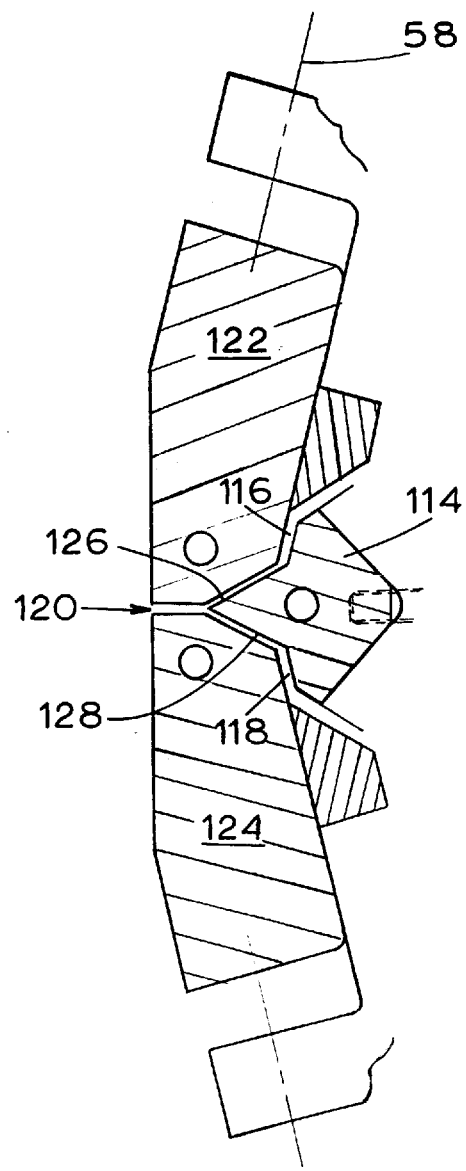
FIG. 5 comprises a section view corresponding to FIG. 3 of another embodiment of the invention.

FIG. 5 depicts yet another embodiment of the illustration wherein a mandrel 114 is employed which is structured to terminate intermediate the forward and rearward ends of the lips. The distribution channels 116, 118 defined in part by the mandrel 114 thus merge within the die to create a chamber 120 between the lips 122, 124 within which the melt foams. The FIG. 5 embodiment, providing mandrel cooling of the nearest surfaces 126, 128 of the distribution channels 116, 118 only part way through the region of the lips 122, 124, is adapted to produce very thin rigid foam sheets with favorable mechanical properties.

Numerous modifications and alternative embodiments of the invention will be apparent to those skilled in the art in view of the foregoing description. Accordingly, this description is for the purpose of teaching those skilled in the art the best mode of carrying out the invention and is to be construed as illustrative only. The details of the structure may be varied substantially without departing from the spirit of the invention, and the exclusive use of all modifications which come within the scope of the appended claims is reserved.

What is claimed is:

1. An extrusion die for foam sheet, comprising:

die body means defining a manifold comprising separate distribution channels for conducting a split stream of heated and pressurized foamable thermoplastic melt;

a pair of mating die lips defining a straight-line die exit and arranged on opposed sides of the distribution channels, the lips at least in part forming an outer wall of said channels, the lips being constructed to adjustably slide toward and away from each other to vary the flow of a melt in the channels; and a mandrel disposed between the die lips and between the separate distribution channels, the mandrel being slidably insertable and removable through a passageway extending through the die transverse to the direction of the melt flow through the distribution channels to enable quick withdrawal and replacement of the mandrel.

2. The die of claim 1 wherein the separate distribution channels defined by the die body means are configured to merge within the die to create a foaming chamber between the lips.

3. The die of claim 1 wherein the separate distribution channels pass through the die body means such that, in operation, a melt will merge and foam outside the die.

4. The die of claim 1 wherein the lips are each mounted to slide along an axis which is tilted rearwardly at an acute angle relative to an orthogonal to the sheet being formed.

5. The die of claim 4 wherein the angle is between about 10 degrees and 20 degrees to the orthogonal.

6. The die of claim 1 wherein the mandrel is configured and adapted for quick withdrawal and replacement from an end of the die through the passageway, whereby to change the thickness of a sheet product to be extruded, the operator need merely quick-change the mandrel and adjust the separation of the lips.

7. The die of claim 1 wherein the mandrel terminates intermediate the forward and rearward ends of the lips to cause the distribution channels defined by the mandrel to merge within the die to create a foaming chamber between the lips.

8. The die of claim 1 wherein the mandrel terminates at a terminus of the die such that the distribution channels are maintained separate throughout the die.

9. The die of claim 1 wherein the lips have a face engaging the melt with a forward face portion being oriented parallel to the sheet and a rear face portion forming an acute angle with the plane of the sheet.

10. The die of claim 1 including a pair of precalibration blocks adapted to be cooled for assisting in forming a skin on the outer surfaces of the melt, the precalibration blocks being affixed to the lips to move therewith.

11. The die of claim 10 wherein an air gap is formed at an interface between each of the precalibration blocks and the lip to which it is affixed to enhance the thermal isolation of the precalibration block from the lip.

12. The die of claim 1 including a pair of adjustable restrictor bars, one located upstream of each of the lips, for regulating the pressure and melt flow in the separate distribution channels.

13. The die of claim 12 wherein the lips are each mounted to slide along a slide axis which is tilted rearwardly at an acute angle relative to an orthogonal to the sheet being formed.

14. The die claim 13 wherein the restrictor bars are mounted contiguous to the adjustable lips and are adapted to slide on further axes parallel to the slide axes of the lips.

15. A die of claim 14 wherein the angles of each of the lip axes and each of the restrictor bar axes are equal and each is between about 10 degrees and 20 degrees relative to an orthogonal to the sheet being formed.

16. The die of claim 1 wherein the passageway in cross-section has a portion which is convergent toward the rear of the die and wherein the mandrel has a mating cross-sectional configuration, the mandrel being adapted to be quickly and securely locked into the convergent portion of the passageway by attachment means applied from the rear of the die.

17. An extrusion die for rigid foam sheet, comprising die body means defining a manifold comprising separate distribution channels for conducting a split stream of heated pressurized foamable thermoplastic melt to a die terminus where nearest surfaces of the separate channels are defined at least in part by a intervening mandrel, and where remote surfaces of the separate channels are defined by mating die lips, both lips being constructed and arranged to adjustably slide toward and away from each other to vary the flow of the melt in the distribution channel wherein the mandrel is disposed between the die lips and between the separate distribution channels, the mandrel being slidably insertable and movable through a passageway extending through the die transverse to the direction of the melt flow through the distribution channels to enable quick withdrawal and replacement of the mandrel.

18. The die of claim 17 wherein the lips are each mounted to slide along an axis which is tilted rearwardly at an acute angle relative to an orthogonal to the sheet being formed.

19. The die of claim 18 wherein the angle is between about 10 degrees and 20 degrees to the orthogonal.

20. An extrusion die for foam sheet, comprising:

die body means defining a manifold comprising separate distribution channels for conducting a split stream of heated foamable and pressurized thermoplastic melt;

a pair of mating die lips defining a straight-line die exit and arranged on opposed sides of the distribution channels, the lips at least in part forming an outer wall of said channels, the lips being constructed to adjustably slide toward and away from each other to vary the flow of a melt in the distribution channels;

a mandrel disposed between the die lips and between the separate distribution channels, the mandrel being slidably insertable and removable through a passageway extending through the die transverse to the direction of the melt flow through the distribution channels to enable quick withdrawal and replacement of the mandrel; and a pair of adjustable restrictor bars, one located upstream of each of the lips, for regulating the pressure and melt flow in the separate channels in the region of the lips.

21. The die of claim 20 wherein the lips are each mounted to slide along an axis which is tilted rearwardly at an acute angle relative to an orthogonal to the sheet being formed.

22. The die of claim 21 wherein the restrictor bars are mounted contiguous to the adjustable lips and are adapted to slide on axes parallel to the slide axes of the lips.

23. The die of claim 22 wherein the angles of each of the lip axes and each of the restrictor bar axes is equal and is between about 10 degrees and 20 degrees to the orthogonal.

* * * * *